(12) United States Patent
Guan

(10) Patent No.: US 8,386,772 B2
(45) Date of Patent: Feb. 26, 2013

(54) METHOD FOR GENERATING SAK, METHOD FOR REALIZING MAC SECURITY, AND NETWORK DEVICE

(75) Inventor: Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 567 days.

(21) Appl. No.: 12/398,580

(22) Filed: Mar. 5, 2009

(65) Prior Publication Data

US 2009/0217032 A1 Aug. 27, 2009

Related U.S. Application Data

(63) Continuation of application No. PCT/CN2007/070602, filed on Aug. 31, 2007.

(30) Foreign Application Priority Data

Sep. 6, 2006 (CN) .......................... 2006 1 0126940

(51) Int. Cl.
*H04L 29/06* (2006.01)
(52) U.S. Cl. ........... 713/154; 709/220; 380/44; 380/279
(58) Field of Classification Search ................... 713/151; 370/229
See application file for complete search history.

(56) References Cited

U.S. PATENT DOCUMENTS

| | | | |
|---|---|---|---|
| 2003/0009540 A1* | 1/2003 | Benfield et al. | 709/220 |
| 2006/0104243 A1 | 5/2006 | Park | |
| 2006/0153375 A1 | 7/2006 | Yi | |
| 2007/0217611 A1* | 9/2007 | Weis | 380/277 |

FOREIGN PATENT DOCUMENTS

| | | |
|---|---|---|
| CN | 156103 | 1/2005 |
| CN | 1805333 A | 7/2006 |
| CN | 101141241 B | 8/2010 |
| KR | 20050066637 | 6/2005 |
| KR | 10-2006-0067099 | 6/2006 |
| KR | 100599199 | 7/2006 |

OTHER PUBLICATIONS

A distributed fault-tolerant group key selection protocol for MACsec. Author: Mick Seaman Date: May 29, 2006.*
Seaman, "A distributed fault-tolerant group key selection protocol for MACsec", http://www.ieee802.org/1/files/public/docs2006/af-seaman-key-selection-protocol-0506-05.pdf, pp. 1-22, (May 29, 2006).

(Continued)

*Primary Examiner* — Nathan Flynn
*Assistant Examiner* — Phuoc Tran
(74) *Attorney, Agent, or Firm* — Leydig, Voit & Mayer, Ltd.

(57) ABSTRACT

A method for generating a secure association key (SAK), a method for realizing medium access control security (MACsec) and a network device are provided. The method for generating an SAK includes the following steps. A sending key selection protocol (KSP) instance sends a key selection protocol data unit (KSPDU) to the other KSP instances in the same secure connectivity association (CA). The KSPDU includes a secure connectivity association key identifier (CKI) of the instance and information about a MACsec level that the sending KSP instance belongs to. If the receiving KSP instance and the sending KSP instance belong to the CA with the same MACsec level, an SAK is generated based on the KSPDU. The MACsec of multiple levels in a communication network and the secure MACsec network communication with multiple levels are realized, thus ensuring the confidentiality of the network communication.

16 Claims, 14 Drawing Sheets

OTHER PUBLICATIONS

IEEE Standard for Local and metropolitan area networks Media Access Control (MAC) Security, IEEE Std. 802.1AE, pp. i-ix and 1-142, (Aug. 18, 2006).

International Search Report from P.R. China in International Application No. PCT/CN2007/070602 mailed Dec. 13, 2007.

Written Opinion of the International Searching Authority issued in related PCT/CN2007/070602 dated Dec. 13, 2007.

IEEE P802.1ad/D6.0, Virtual Bridged Local Area Networks—Amendment 4: Provider Bridges, Draft Standard for Local and Metropolitan Area Networks, Prepared by the Interworking Task group of IEEE 802.1, dated Aug. 17, 2005.

P802.1AE—Standard for Local and Metropolitan Area Networks: Media Access Control (MAC) Security, https://spadev.ieee.org/cgi-bin/sadb/print_par?print:1393, dated Sep. 13, 2003.

IEEE Standard for Local and metropolitan area networks—Virtual Bridged Local Area Networks Amendment 7: Provider Backbone Bridges, IEEE Computer Society, IEEE Std 802.1ah™-2008, dated Aug. 2008.

* cited by examiner

| ( Destination Address ) | | | | | | | | | |
|---|---|---|---|---|---|---|---|---|---|
| ( Source Address ) | | | | | | | | | |
| (KSP EtherType) | | | | | | | | | |
| KSP Version: KSP EtherType | ic | LAN valid identifier: is | LAN | Sending usage identifier: tx | Receiving usage identifier: rx | OAN valid identifier: is | OAN | Sending usage identifier: tx | Receiving usage identifier: rx | dp |
| CKI | | | | | | | | | |
| SCI | | | | | | | | | |
| MI | | | | | | | | | |
| MN | | | | | | | | | |
| KC | | | | | | | | | |
| LKI | | | | | | | | | |
| OLPN | | | | | | | | | |
| OKC | | | | | | | | | |
| | | | | | | | | | |
| Live Peer List or List Length | | | | | | | | | |
| MI | | | | | | | | | |
| MN | | | | | | | | | |
| | | | | | | | | | |
| MI | | | | | | | | | |
| MN | | | | | | | | | |
| | | | | | | | | | |
| MI | | | | | | | | | |
| MN | | | | | | | | | |
| 0000 0000 0000 0000 | | | | | | | | | |
| ICV | | | | | | | | | |

FIG. 3

| Destination Address | | | | | | | | | |
|---|---|---|---|---|---|---|---|---|---|
| Source Address | | | | | | | | | |
| KSP EtherType | | | | | | | | | |
| KSP Version: KSP EtherType | ic | LAN valid identifier: is | LAN | Sending usage identifier: tx | Receiving usage identifier: rx | OAN valid identifier: is | OAN | Sending usage identifier: tx | Receiving usage identifier: rx | dp |
| CKL | | | | | | | | | |
| CKI | | | | | | | | | |
| SCI | | | | | | | | | |
| MI | | | | | | | | | |
| MN | | | | | | | | | |
| KC | | | | | | | | | |
| LKI | | | | | | | | | |
| OLPN | | | | | | | | | |
| OKC | | | | | | | | | |
| | | | | | | | | | |
| Live Peer List or List Length | | | | | | | | | |
| MI | | | | | | | | | |
| MN | | | | | | | | | |
| | | | | | | | | | |
| MI | | | | | | | | | |
| MN | | | | | | | | | |
| | | | | | | | | | |
| MI | | | | | | | | | |
| MN | | | | | | | | | |
| 0000 0000 0000 0000 | | | | | | | | | |
| ICV | | | | | | | | | |

FIG. 8

| MACsec frame parameter | MACsec level | Control information | OA | SL | Frame number | SCI |

METHOD FOR GENERATING SAK, METHOD FOR REALIZING MAC SECURITY, AND NETWORK DEVICE

This application is a continuation of international application number PCT/CN2007/070602, filed Aug. 31, 2007, and claims the benefit of priority to China Patent Application No. 200610126940.0, filed on Sep. 6, 2006, and entitled "METHOD FOR REALIZING MAC SECURITY AND NETWORK DEVICE", both of which are incorporated herein by reference in their entirety.

BACKGROUND OF THE INVENTION

1. Field of the Invention

The present invention relates to the field of network communication and more particularly to a method for generating a secure association key (SAK), a method for realizing medium access control security (MACsec), and a network device.

2. Background of the Invention

The technique about the security of the network link layer is an important research subject for network communication, and the IEEE 802.1.ae task group has studied this subject, and proposed to ensure the security of Layer 2 communication through medium access control security (MACsec) so as to protect Layer 2 from being attacked. Particularly, the above MACsec manner includes the following steps. A sending MACsec entity (SecY) encrypts data to be sent with a secure association key (SAK), and then a receiving SecY receives the data and decrypts the data with the same SAK to obtain the data, thereby ensuring the confidentiality of the data. Meanwhile, by checking an integrity check value (ICV), the receiving SecY determines that the received data is consistent with the data sent by the sending SecY, thus ensuring the integrity and correctness of the data.

Currently, the IEEE 802.1.ae task group has specified that the MACsec is based on a local area network (LAN) in the protocols. If the SecYs intend to communicate with each other, they need to belong to the same secure connectivity association (CA), and the SecYs in the same CA own the same secure connectivity association key (CAK). The CAK may be configured manually or obtained from an authentication server after being authenticated. The SecYs negotiate with each other through the CAK to generate an SAK. The SAK varies and is updated continuously, but the CAK remains constant. Even if the device is rebooted, the CAK still remains constant. The continuous variation and update of the SAK greatly enhance the security of the data.

FIG. 1 is a schematic view of a communication among medium access control (MAC) devices in the same shared medium LAN in the prior art. Referring to FIG. 1, MAC devices A, B, C, and D are located in the same shared medium LAN, and the MAC devices can visit and communicate with each other. It is assumed that the MAC devices A, B, and C belong to the same CA and own the same CAK, except the MAC device D. As shown in FIG. 2, apparently, the SecYs on the MAC devices A, B, and C can carry out the secure MACsec communication. Unfortunately, as the MAC D does not have the SAK, even if capturing a MACsec frame sent from A, B, or C, the MAC D still cannot decrypt the frame.

The IEEE 802.1af task group further specifies the generation of the SAK. The SAK used by the SecYs is obtained from a MAC security key agreement entity (KaY). One KaY may include one or more key selection protocol (KSP) instances, among which one KSP instance corresponds to one SecY, and they all own the same CAK. One KSP instance negotiates with the other KSP instances belonging to the same CA by using the CAK so as to obtain the SAK, and then submits the SAK to the SecYs that belong to the current CA. The data packets received and sent by the KSP instance are forwarded via the KaY corresponding to the current KSP instance. That is to say, when the KSP instance needs to send a data packet to a link, it first sends the data packet to a corresponding KaY, and then the KaY forwards the data packet to the link.

The SAK is generated through interactive communication of a key selection protocol data unit (KSPDU) by using a KSP protocol. FIG. 3 is a schematic view of a KSPDU frame format. A destination MAC address of a KSPDU frame is a multicast address, so that all the MAC devices in the same LAN can receive the KSPDU. The bridge does not forward the KSPDU, but filters out the KSPDU, so as to limit the KSPDU within the same LAN, thus achieving the MACsec communication within the LAN.

However, as the current key agreement techniques are all directed to the LAN, all the SecYs belonging to the same CA need to be located in the same LAN, and accordingly the data protection through the MACsec can only be realized hop by hop, that is, it requires encryption and decryption at each link. Referring to FIG. 4, as for a network system formed by bridges, an encrypted communication frame sent between a user terminal A and a user terminal B can be decrypted at a bridge 1, a bridge 2, and a bridge 3, so as to read a user data, which poses a great threat to the security of the user data. Especially, when the bridges in the middle are not managed by the user himself/herself, the security and confidentiality of the user data cannot be guaranteed at all.

SUMMARY OF THE INVENTION

Embodiments of the present invention provide a method for generating a secure association key (SAK) and a network device, so as to realize a medium access control security (MACsec) of multiple levels in a communication network and a secure MACsec network communication with multiple levels.

Embodiments of the present invention further provide a method for realizing MACsec for network communication and a network device, so as to ensure the confidentiality of the network communication.

The method for generating an SAK provided in an embodiment includes the following steps.

A sending KSP instance sends a key selection protocol data unit (KSPDU) to the other KSP instances. The KSPDU includes a secure connectivity association key identifier (CKI) of the sending KSP instance and information about a MACsec level that the sending KSP instance belongs to.

If the receiving KSP instance and the sending KSP instance belong to a secure connectivity association (CA) with the same MACsec level, an SAK is generated based on the KSPDU.

Therefore, the method provided by the embodiment of the present invention has made a breakthrough in eliminating the problem in the prior art that the MACsec technique is merely restricted to being applied within an LAN. Among various LANs or within the overall Ethernet communication system, MACsec of multiple levels is provided according to the application range of the MACsec, and the key agreement technique is provided for MACsec in each level, so that different MACsec levels may be selected depending on actual requirements of the MACsec. Each MACsec level is independent from each other and cannot be decrypted among each other, so as to ensure the confidentiality and security of the Ethernet communication, thereby facilitating the control of the confidentiality of the communication.

A method for generating an SAK provided in an embodiment includes the following steps.

A sending KSP instance sends a KSPDU to the other KSP instances. A destination address of the KSPDU is a MAC multicast address corresponding to a MACsec application range.

If the receiving KSP instance and the sending KSP instance belong to the same CA, an SAK is generated based on the KSPDU.

The method provided by the embodiment of the present invention has made a breakthrough in eliminating the problem in the prior art that the MACsec technique is merely restricted to being applied within an LAN. Among various LANs or within the overall Ethernet communication system, the key agreement technique is provided for each MACsec level according to the MACsec application range, so as to ensure the confidentiality and security of the Ethernet communication, thereby facilitating the control of the confidentiality of the communication.

A method for realizing MACsec of network communication provided in an embodiment includes the following steps.

A sending MACsec entity (SecY) encrypts a communication frame by using an SAK and sends the communication frame.

A receiving SecY determines whether the receiving SecY has the SAK of the communication frame or not. If the receiving SecY has the SAK of the communication frame, the communication frame is decrypted by using the SAK. Otherwise, if the receiving SecY is at a bridge device, the communication frame is forwarded, and if the receiving SecY is at a terminal equipment, the communication frame is dropped.

Seen from the above technical solution, if MACsec levels are preset in the communication network according to the MACsec application range, and meanwhile a MAC security key agreement entity (KaY), SecY, KSP instance, and CAK corresponding to the KSP instance are preset in each MACsec level, different MACsec levels can be selected for encrypting and decrypting data according to different MACsec application requirements. Each MACsec level is independent from each other and cannot be decrypted among each other, so as to ensure the confidentiality and security of the Ethernet communication, thereby facilitating the control of the confidentiality of the communication. Compared with the prior art, the method according to an embodiment of the present invention may greatly enhance the communication efficiency.

A network device including a KSP instance, an uncontrolled port, and a KaY us provided in an embodiment. The KSP instance includes a sending unit, a receiving unit, and an SAK generation unit.

The sending unit is adapted to send a KSPDU to the other KSP instances via the KaY, and carry a CKI of the current KSP instance and a MACsec level identifier that the current KSP instance belongs to in the KSPDU.

The receiving unit is adapted to receive a KSPDU sent to the current KSP instance via the KaY.

The SAK generation unit is adapted to generate an SAK based on the KSPDU received by the receiving unit.

Seen from the above technical solution, the network device provided by the embodiment of the present invention has made a breakthrough in eliminating the problem in the prior art that the MACsec technique is merely restricted to being applied within an LAN. Among various LANs or within the overall Ethernet communication system, MACsec of multiple levels is provided according to the application range of the MACsec, and the key agreement technique is provided for MACsec in each level, so that different MACsec levels may be selected depending on actual requirements of the MACsec. Each MACsec level is independent from each other and cannot be decrypted among each other, so as to ensure the confidentiality and security of the Ethernet communication, thereby facilitating the control of the confidentiality of the communication.

A network device including a SecY is provided in an embodiment. The SecY includes a receiving unit, an encryption unit, an SAK determination unit, and a decryption unit.

The receiving unit is adapted to receive a communication frame.

The encryption unit is adapted to encrypt the communication frame by using an SAK.

The SAK determination unit is adapted to determine whether the SecY has the SAK of the communication frame or not.

The decryption unit is adapted to decrypt the communication frame by using the SAK if the SecY has the SAK of the received communication frame according to a determination result of the SAK determination unit.

Seen from the above technical solution, the network device provided by the embodiment of the present invention can select different MACsec levels to encrypt and decrypt data depending on actual requirements of the MACsec if MACsec levels are preset in the communication network according to the MACsec application range, and meanwhile the SAK is preset on the network device configured with a MACsec mechanism in the network. Each MACsec level is independent from each other and cannot be decrypted among each other, so as to ensure the confidentiality and security of the Ethernet communication, thereby facilitating the control of the confidentiality of the communication. Compared with the prior art, the method according to an embodiment of the present invention may greatly enhance the communication efficiency.

BRIEF DESCRIPTION OF THE DRAWINGS

The present invention becomes more fully understood from the detailed description given herein below for illustration only, and thus constitutes no limitation to the present invention, and in which:

FIG. 3 is a schematic view of a KSPDU frame format in the prior art;

FIG. 8 is a schematic view of a KSPDU frame format according to Embodiment 1 of the present invention;

DETAILED DESCRIPTION OF THE EMBODIMENTS

In order to make those skilled in the art have a better understanding of the content of the present invention, a detailed description is given below by embodiments with the accompanying drawings.

Embodiment 1

In this embodiment, a method for generating an SAK in a network with MACsec of multiple levels is described in detail.

Figure 1:
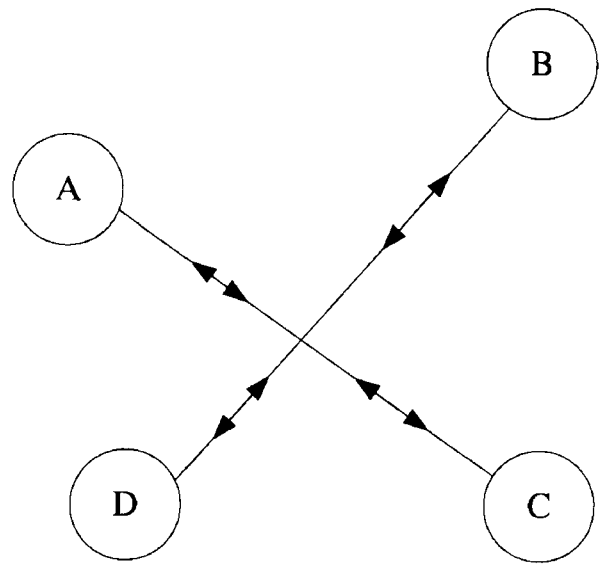
FIG. 1 is a schematic view of a communication among MAC devices in the same shared medium LAN in the prior art.
Figure 2:
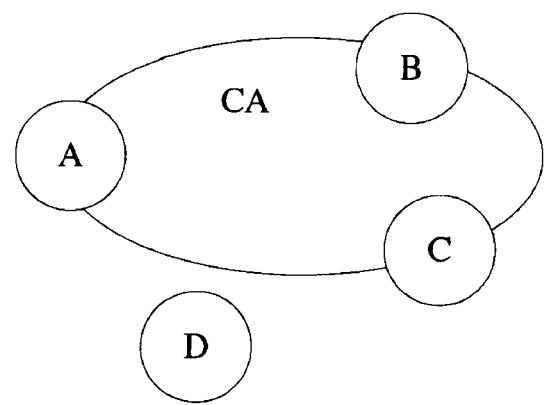
FIG. 2 is a schematic view of a MACsec communication in the same LAN in the prior art.
Figure 4:
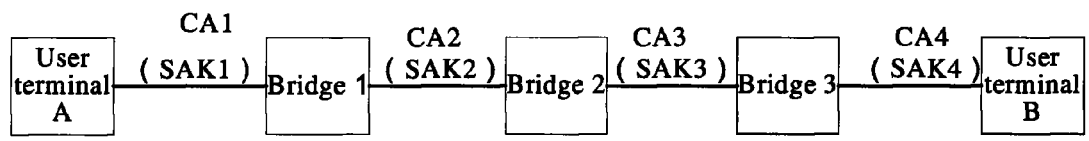
FIG. 4 is a network system with bridges in the prior art.
Figure 5:
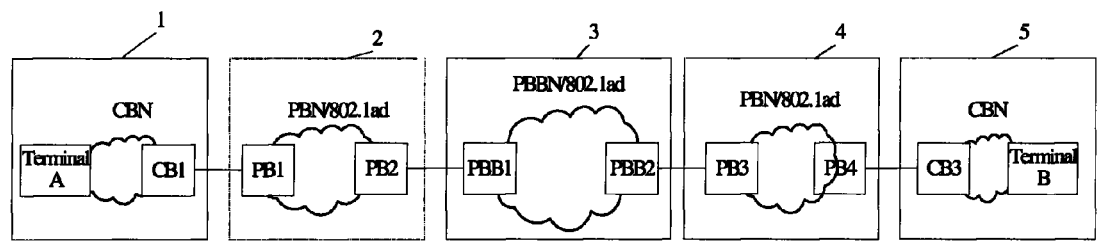
FIG. 5 is a schematic structural view of a Metro Ethernet according to an embodiment of the present invention.
Figure 6:
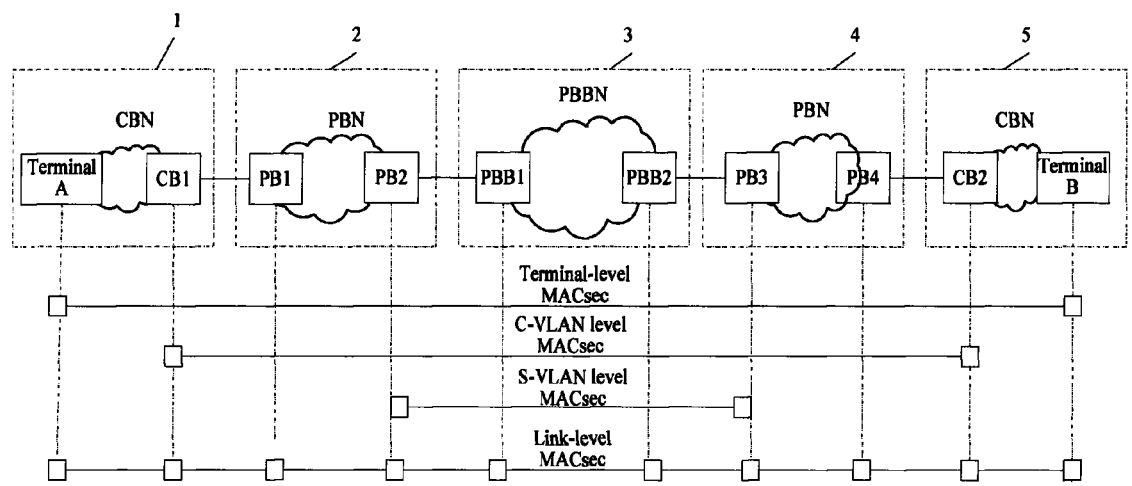
FIG. 6 is a schematic view of a MACsec level division in a Metro Ethernet according to an embodiment of the present invention.

Taking a Metro Ethernet system shown in FIG. 5 as an example, the system is formed by terminals and node bridges of customer bridged networks (CBNs), provider bridged networks (PBNs), and a provider backbone bridged network (PBBN). It is assumed that a MACsec mechanism shown in FIG. 6 is preset in the network shown in FIG. 5. Referring to FIG. 6, in this embodiment of the present invention, the MACsec is divided into four levels in the network system.

The first level is a link-level MACsec. As for this level of MACsec, in the communication network, each link between terminals in each LAN and adjacent bridges and each link between the adjacent bridges respectively adopt MACsec independently, that is, the encryption and decryption operations are merely performed between devices within the same LAN, and the MACsec between each link is independent from each other. The MACsec of this level is applicable to the transmission of a control protocol frame within the LAN, for example, a spanning tree protocol (STP), rapid spanning tree protocol (RSTP), multiple spanning tree protocol (MSTP), or generic attribute registration protocol (GARP) of the LAN itself. As these protocols are hop by hop within the LAN, the MACsec of the current level can be adapted to ensure the confidentiality of the control signaling transmission as well as the security of the control plane of the LAN.

The second level is a service provider VLAN (S-VLAN) level MACsec. This level of MACsec spans across the PBBN, and is configured on bridges located at edges of the PBNs and connected to the PBBN (e.g., PB2 and PB3 shown in FIG. 6). This level of MACsec is adapted to provide MACsec services for users within the same B-VLAN, so that the encryption and decryption operations are merely performed between user equipments within the same B-VLAN, and the bridges on the PBBN cannot decrypt a frame encrypted by using this level of MACsec. That is to say, the S-VLAN level MACsec provides a service of penetrating the PBBN for PBBN users. Meanwhile, this level of MACsec provides a service of penetrating the PBBN for the transmission of control protocol frames between the PBNs. For example, a control protocol frame sent from a PBN2 to a PBN4 is encrypted at the PB2 of the PBN2 by using the second level of S-VLAN level MACsec. When reaching a bridge at the edge of the PBBN, the encrypted control protocol frame is processed as a common user data by the PBBN till it reaches the device PB3 at the edge of the PBN4, and at this point the control protocol frame is decrypted and adapted to configure and manage the PBN4.

The third level is a customer VLAN (C-VLAN) level MACsec. This level of MACsec spans across the PBNs and the PBBN, and is disposed at edge user bridges connected to the PBN networks within the CBN (e.g., CB1 and CB2 shown in FIG. 6). This level of MACsec provides a MACsec service for the users within the same S-VLAN, so that the encryption and decryption operations are merely performed between user equipments within the same S-VLAN, and the bridges on the PBNs and the PBBN cannot decrypt a frame encrypted by using this level of MACsec. That is to say, the C-VLAN level MACsec provides a service of penetrating the PBNs and the PBBN for PBN users. Similar to the second level of MACsec, this level of MACsec provides a service of penetrating the PBNs and the PBBN for the transmission of control protocol frames between the CBNs.

The fourth level is a terminal-user-level MACsec. This level of MACsec is disposed at terminals, and provides MACsec services for users within the same C-VLAN, so that the encryption and decryption operations are merely performed between users within the same C-VLAN, and the bridges in the CBNs, PBNs, and PBBN between the users cannot decrypt frames of the users. That is to say, the terminal-user-level MACsec provides a service of penetrating the CBNs, PBNs, and PBBN for terminal users.

Therefore, in this embodiment of the present invention, the MACsec is respectively disposed between each link of the Ethernet communication system, which not only provides the MACsec services for the users within the LAN, but also provides security guarantees for the hop-by-hop communication of a control plane protocol of the network itself within the current network.

Further, as for an Ethernet communication system with PBNs and a PBBN, MACsec is configured at edge bridges located at the edge of each PBN and connected to the PBBN so as to provide security services for users within the same backbone-VLAN (B-VLAN), so that the encryption and decryption operations are merely performed between user equipments within the same B-VLAN, and the bridges on the PBBN cannot decrypt the encrypted frames. Therefore, the network provides a service penetrating the PBBN for the PBBN users.

Moreover, in this embodiment of the present invention, as for an Ethernet network system with CBNs and an Ethernet communication system with PBNs and/or a PBBN, the MACsec is configured on bridges located at the edge of each CBN and connected to the PBNs, so that the encryption and decryption operations are merely performed between user equipments within the same S-VLAN, and the PBNs and/or the PBBN cannot decrypt the encrypted frame. Therefore, the network system provides a service of penetrating the PBNs and/or the PBBN for the PBN users.

In addition, in the present invention, the MACsec level is disposed between each terminal of the Ethernet, which may be adapted to provide security services for terminal users, and encrypt the data between the terminal users by using the MACsec, so that the bridges (e.g., the CBN, PBN, and/or PBBN) between the terminals cannot decrypt the user data. Therefore, the MACsec level provides a service of penetrating all the bridges between terminals for the terminal users.

Accordingly, as for the user data communication between the terminal users, the MACsec level between the terminals may be selected for encrypting and decrypting data, which not only prevents any bridge between the terminals from decrypting the user data and ensures the confidentiality of the data communication, but also achieves a higher network communication efficiency compared with the operation mode in the prior art of decrypting and encrypting link by link by using the MACsec. Moreover, in the user data communication between the terminal users, upon requirements of the user, the MACsec level between the CBNs and/or MACsec levels between the PBNs may be further selected to encrypt the user data, so that the user data is encrypted through multiple levels, and the confidentiality of the user data is ensured. Meanwhile, compared with the operation mode in the prior art of decrypting and encrypting link by link by using the MACsec, a higher network communication efficiency is still achieved.

In this embodiment of the present invention, regarding the configured MACsec levels, the higher the MACsec level is, the larger the span for penetrating the network will be. If an external level of the network adopts a high MACsec level for encryption, an internal level of the network does not need an encryption protection through a low MACsec level. Definitely, if a safer MACsec is required, both the internal level and the external level of the network may adopt individual MACsec for encryption protection, which may be selected upon the user's requirements in practice.

In this embodiment of the present invention, in the KSPDU for generating the SAK, four optional solutions are provided on how to identify the level that the KSP instance for sending the KSPDU belongs to, so that different solutions can be adopted according to actual requirements, and thus the method of the present invention is easy to implement. Further, in this embodiment of the present invention, when the KSPDU communication for generating the SAK is a point-to-point communication, besides the multicast manner, a unicast manner may also be adopted to send the KSPDU. Therefore, this embodiment of the present invention further expands the manner for sending the KSPDU as compared with the prior art in which the KSPDU is sent merely in the multicast manner.

It should be noted that, the MACsec level division method shown in FIG. 6 is directed to a Metro Ethernet network. In practice, based on the embodiment of the present invention, different MACsec level divisions may be implemented according to different network structures and MACsec requirements. For example, the MACsec levels may be divided by selecting any MACsec level or any combination of the above MACsec levels.

After different MACsec level divisions are preset in the network, and the CAK is configured for each MACsec level respectively, the KSP instance configures and sends the KSPDU, and then exchanges the KSPDU with the other KSP instances in the same CA, so as to generate the SAK. Once the KSP instance in each level obtains the SAK, the KSP instance is able to perform a MACsec communication of multiple levels by using the SAK.

Figure 7:
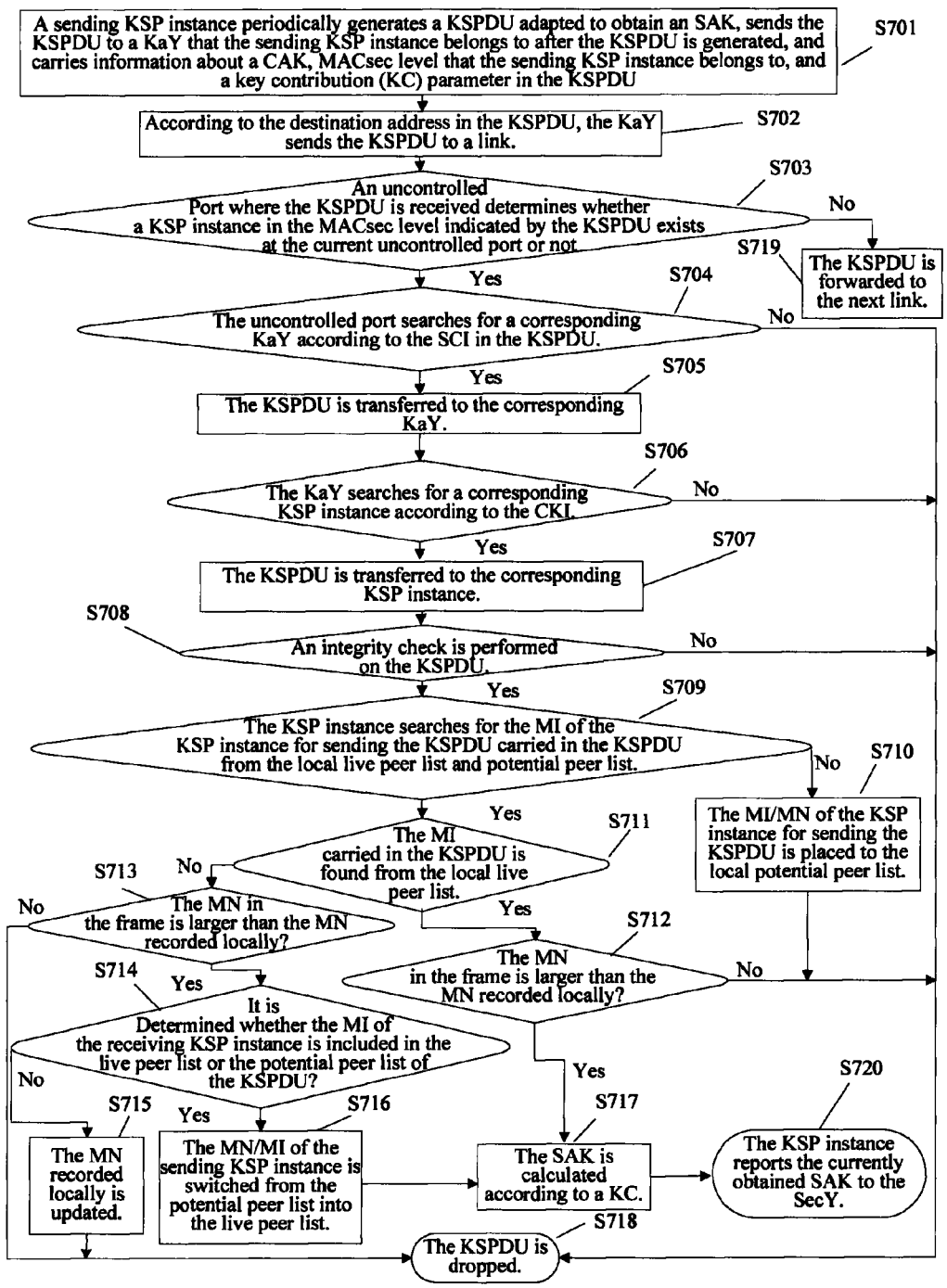
FIG. 7 is a schematic flow chart of a method for obtaining an SAK according to Embodiment 1 of the present invention.

FIG. 7 is a schematic flow chart of a method for obtaining an SAK through calculation. The method includes the following steps.

In Step S701, a sending KSP instance periodically generates a KSPDU adapted to obtain an SAK, sends the KSPDU to a KaY that the sending KSP instance belongs to after the KSPDU is generated, and carries information about a CAK, MACsec level that the sending KSP instance belongs to, and a key contribution (KC) parameter in the KSPDU.

Before using the MACsec, a device needs to obtain the CAK. The CAK may be configured manually or obtained from an authentication server after being authenticated. When configuring the CAK, the MACsec level that the CAK belongs to needs to be clearly stated.

The KSP instance configures the KSPDU and carries the MACsec level that the KSP instance belongs to in the KSPDU in the following manners.

1. A field CAK level (CKL) is added in the KSPDU for carrying the MACsec level that the sent KSPDU belongs to. It is suggested that the field should be arranged before the CAK identifier (CKI) in the KSPDU, and have a length of 1 byte, as shown in FIG. 8. However, the position and length of the field are not limited herein.

2. Different multicast MAC addresses are used in the destination address of the KSPDU, so that the multicast MAC addresses reflect the MACsec levels. In order to realize MACsec with different levels, a plurality of multicast addresses needs to be introduced, and each multicast address corresponds to one MACsec level. Table 1 shows a preferred one to one corresponding relation, in which x is to be determined, and y is determined by the MACsec level. The embodiment of the present invention is not limited to such corresponding relation.

TABLE 1

| 01-80-C2-xx-xx-xy | |
|---|---|
| MACsec Level | y (formed by four bits) |
| Fourth Level: Terminal-level MACsec | 3 |
| Third Level: C-VLAN level MACsec | 2 |
| Second Level: S-VLAN level MACsec | 1 |
| First Level: Link-level MACsec | 0 |

3. The CKIs are planned to make CKI values in different ranges fall into different MACsec levels respectively.

4. The CKIs are preset in the MACsec network device, each corresponding to a specific MACsec level.

5. Under the point-to-point circumstance, when a secure channel identifier (SCI) formed by a MAC address and a virtual port number for an opposite end network device is preset at the KSP instance, a MACsec level is preset as well, so that the SCI of the opposite end corresponds to a specified MACsec level. Therefore, the receiving KSP instance gets to know the MACsec level that the sent KSPDU belongs to according to the SCI of the KSPDU and the preset corresponding relation.

The sending KSP instance may select any of the above manners for indicating the MACsec depending on actual requirements, and carry information about a MACsec level in the KSPDU. It is assumed that the first manner is adopted, and accordingly a configured KSPDU frame is shown in FIG. 8.

A destination address is a specific multicast MAC address for a KSP protocol itself. A source address is a MAC address for the sending KSP instance. A KSP EtherType is adapted to identify a KSP protocol. Version is a version number of the KSP. The subsequent group of fields including a latest association number (LAN) valid identifier "is", LAN, sending usage identifier "tx", and receiving usage identifier "rx" are configured to indicate information about the latest key. Among these fields, "is" indicates whether the latest information about the latest key exists in the frame or not, and if true, the subsequent LAN, latest key identifier (LKI), and latest lowest acceptable packet number (LLPN) have certain meanings. The LAN is an association number (AN) corresponding to the latest key SAK. When "tx" is true, it indicates encrypting data to be sent by using the latest SAK; otherwise, the latest SAK is not used. When "rx" is true, it indicates decrypting the data to be sent by using the latest SAK; otherwise, the latest SAK is not used. Subsequently, a LAN valid identifier "is", an old association number (OAN), a sending usage identifier "tx", and a receiving usage identifier "rx" are configured to indicate information about an old key. If "is" is true, the subsequent OAN, old key identifier (OKI), and old lowest acceptable packet number (OLPN) have certain meanings. The OAN is an AN corresponding to the old key SAK. As the SAK is required to vary continuously in the same secure channel (SC), the SC needs to maintain an old SAK. Even when a new SAK has already been installed and started to be used, the old SAK still needs to be maintained. The reason is that the sent frames possibly encrypted with the old SAK may be currently stored in a receiving buffer or transferred over the network, and thus the old SAK is maintained to decrypt these frames. The CKI represents a CAK identifier and is adapted to distinguish a CA. The SCI represents a secure channel identifier. A membership identifier (MI) is a random number, and adapted to identify a KSP instance, which is unique in a CA. If the MI of the KSP instance itself contradicts another one, a new MI is generated. MN is a message number starting from 1, and added by 1 each time when one KSPDU is sent. In addition, when the MI is changed, the MN is reset to 1, and when the MN overflows, the MI is changed.

Each KSP instance has its own MI/MN, and needs to maintain both the MI/MN of its own and that of the opposite end. If the KSP instance finds that the opposite end KSP instance has the same CAK as the current KSP instance, it places the MI/MN of the opposite end into a live peer list. If the current KSP instance cannot prove that the opposite end KSP instance owns the same CAK as the current KSP instance, it places the MI/MN of the opposite end into a potential peer list. When sending the KSPDU, the KSP instance carries the MI/MN of the current KSP instance and all the MI/MNs in the live peer list and the potential peer list in the KSPDU for being sent, and calculates an integrity check value (ICV) through a cipher-based message authentication code (CMAC) mode of an advanced encryption standard (AES):

$$ICV=AES-CMAC(K,M,128).$$

M indicates all the bytes from the destination MAC address to the ICV, and K is generated through an ElectronicCode-Book (ECB) mode of the AES:

$$K=AES-ECB(CAK,0X1).$$

Therefore, the ICV value is generated by using the CAK, and it can be checked only when the receiving KSP instance owns the same CAK.

The meanings of the other fields are the same as those specified in the IEEE802.1af protocol.

After configuring the KSPDU, the sending KSP instance periodically sends the KSPDU frame via a KaY.

In Step S702, the KaY sends the KSPDU to a link according to the destination address in the KSPDU.

In Step S703, an uncontrolled port where the KSPDU is received determines whether a KSP instance in the MACsec level indicated by the KSPDU exists at the current uncontrolled port or not. If yes, Step S704 is performed; otherwise, go to Step S719.

When the KSPDU reaches the next communication device via the link under an uncontrolled port indication, the uncontrolled port reads a CAK level (CAL) field of the MACsec level in the KSPDU to get to know the MACsec level that the KSPDU belongs to, and determines whether a KSP instance in the MACsec level indicated by the KSPDU exists at the current uncontrolled port or not. If yes, Step S704 is performed; otherwise, go to Step S719.

In S704, the uncontrolled port searches for a corresponding KaY according to the SCI in the KSPDU, and if the corresponding KaY is obtained, Step S705 is performed; otherwise, go to Step S713.

In Step S705, the KSPDU is transferred to the corresponding KaY.

In Step S706, the KaY searches for a corresponding KSP instance according to the CKI, and if the corresponding KSP instance is obtained, Step S707 is performed; otherwise, go to Step S713.

In Step S707, the KSPDU is transferred to the corresponding KSP instance.

In Step S708, an integrity check is performed on the KSPDU, and if the check is successful, Step S709 is performed; otherwise, go to Step S713.

The receiving KSP instance adopts the same algorithm for obtaining the ICV as the sending KSP instance, and carries out the same calculation on all the bytes from the destination MAC address to the ICV. If the ICV values are identical, the KSPDU is considered unchanged. If the sending KSP instance adopts a different CAK, the check fails. As the integrity check of the KSPDU fails, the KSPDU is directly dropped without performing the subsequent process.

In Step S709, the KSP instance searches for the MI of the KSP instance for sending the KSPDU carried in the KSPDU from the local live peer list and potential peer list. If the MI is not obtained, Step S710 is performed; otherwise, go to Step S711.

In Step S710, the MI/MN of the KSP instance for sending the KSPDU is placed in the local potential peer list, and the flow skips to Step S718.

In Step S711, if the MI carried in the KSPDU is found from the local live peer list, Step S712 is performed; otherwise, if the MI carried in the KSPDU is found from the local potential peer list, Step S713 is performed.

In Step S712, it is determined whether the MN in the frame is larger than the MN recorded locally, and if yes, Step S717 is performed; otherwise, go to Step S718.

It is determined whether the MN in the frame is larger than the MN recorded locally, and if not, it indicates that the KSPDU is a mis-sequence or replay attack frame that needs to be directly dropped.

In Step S713, it is determined whether the MN in the frame is larger than the MN recorded locally or not, and if yes, Step S714 is performed; otherwise, go to Step S718.

In Step S714, it is determined whether the MI of the receiving KSP instance is included in the live peer list or the potential peer list of the KSPDU, and if yes, Step S716 is performed; otherwise, go to Step S715.

In Step S715, the MN recorded locally is updated, and the flow skips to Step S718.

In Step S716, the MN/MI of the sending KSP instance is switched from the potential peer list into the live peer list, and Step S717 is performed.

In Step S717, the SAK is calculated according to a KC.

One of the important fields in the KSPDU is the KC. When one KSP instance is generated, a random number is generated to serve as the KC. Each KSP instance periodically multicasts a KSPDU, and meanwhile receives KSPDUs multicasted from the other KSP instances, so that the KSP instance within the same CA finally obtains the KSPDUs sent from all the other KSP instances.

In the calculation of the SAK, each KSP instance extracts the KCs from all the received KSPDUs, then sorts all the KCs into a large random number M according to the sequence of the MIs of the sending KSP instances, and calculates the SAK through the CMAC mode of the AES:

$$SAK=AES-CMAC(K,M,128).$$

M is the large random number, and K is generated through the ECB mode of the AES:

$$K=AES-ECB(CAK,0X2).$$

Each KSP instance owns the same CAK and M, so that the SAK calculated by each KSP instance is identical. When a certain KSP instance intends to apply for a new SAK, it merely needs to change its own KC, and accordingly all the KSP instances need to recalculate the SAK. Each SAK is identified by a key identifier (KI), and the KI is an XOR value of all the KCs.

In Step S718, the KSPDU is dropped.

In Step S719, the KSPDU is forwarded to the next link.

The uncontrolled port directly forwards the KSPDU to one link, and after receiving the KSPDU, an uncontrolled port of the next network device continuously processes the KSPDU by using the flow of the method from Step S704 to Step S720.

In Step S720, the KSP instance reports the currently obtained SAK to the SecY.

It should be noted that, besides the above calculation, the SAK may be obtained according to the sent KSPDU through an SAK distribution manner.

In the SAK distribution manner, first of all, one KSP instance is selected from each CA in each MACsec level to function as a key server, or the key server may be determined through configuration or determined according to a protocol. Generally, after receiving the KSPDUs sent from the other KSP instances in a multicast manner, the current KSP instance compares the MI of its own with the MIs of the sending KSP instances of the KSPDUs, so as to select a KSP instance with the maximum MI or minimum MI to function as the key server. The key server performs an XOR operation on the KCs of all the KSP instances to serve as the KI, selects one random number to serve as the SAK, and encrypts the SAK by using a key encrypting key (KEK). The KEK is calculated through the ECB mode of the AES:

$$KEK=AES-ECB(CAK,0X0).$$

The encrypted SAK and the KI are carried in the KSPDU for being multicasted to each KSP instance, and after receiving the KSPDU, the KSP instances perform the decryption with the KEK to obtain the SAK.

Embodiment 2

In this embodiment, as for a network system with MACsec of multiple levels, data transmission of different MACsec mechanisms is achieved by using the SAK.

When one device realizes the MACsec of multiple levels, the operations of each level are the same as those of the link-level MACsec. In order to enhance the efficiency, it is unnecessary to encrypt by a lower MACsec level the frames already encrypted by a higher MACsec level.

Figures 9, 10:
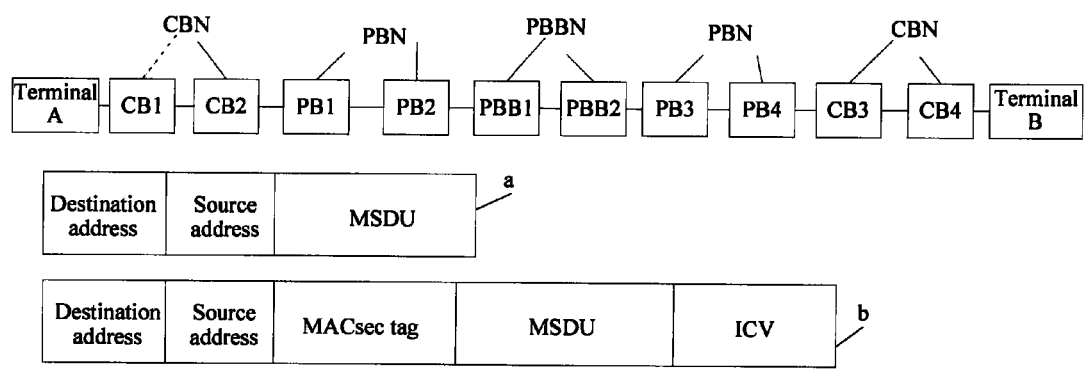
FIG. 9 shows an encrypted frame format obtained after a user data is encrypted by a terminal A shown in FIG. 6 with a terminal-level MACsec.
FIG. 10 shows a frame format obtained after a CB1 adds a VLAN tag to the encrypted frame in FIG. 9.

For example, in a terminal equipment located at the outermost edge of the network, if the fourth level terminal-user-level MACsec and the first level link-level MACsec are both configured, user frames sent by a terminal user need to be encrypted by using the fourth level terminal-user-level MACsec, without being encrypted by using the first level link-level MACsec any more. As shown in FIG. 9, the user-level MACsec and the link-level MACsec are configured at terminals A and B, the third level C-VLAN level MACsec and the first level link-level MACsec are configured at the CB2 and CB3, and the second level S-VLAN level MACsec and the first level link-level MACsec are configured at the PB2 and PB3.

When the terminal A sends a user frame (with respect to a Layer 2 control protocol frame), the terminal A encrypts a MAC service data unit (MSDU) with an SAK of the fourth level user-level MACsec. Referring to FIG. 9, a shows a frame format before encryption, and b shows a frame format after the frame in a is encrypted. Seen from b, after the MSDU is encrypted, a MACsec tag needs to be added before the MSDU, and an ICV is added after the MSDU. If the terminal A sends a control protocol frame of the CBN, such as a GARP multicast registration protocol (GMRP) packet, instead of a user frame, the terminal A encrypts the frame by using the SAK of the first level link-level MACsec. Therefore, the bridges on the CBN can decrypt the control protocol frame, but cannot decrypt the user frame sent by the terminal A.

When a CB1 user bridge receives a MACsec frame, as the MACsec frame carries a link-level SAK, a check encryption operation is performed. However, a user frame encrypted by using the fourth level user-terminal-level SAK does not have a corresponding SAK, so that no corresponding SAK can be found in the decryption operation. At this point, the user frame can only be forwarded, and meanwhile, when the CB1 supports the VLAN, a C-VLAN tag is added before the encrypted MSDU, and the frame format thereof is shown in FIG. 10. If the user frame needs to be transferred to the terminal B, the user frame needs to enter the PBN via the CB2, and then enters the PBBN via the PB2. Although MACsec in two levels exists on the CB2 and the PB2, no more encryption is carried out in order not to affect the efficiency, and the frame is merely forwarded. If the user has a special security requirement, the frame may be further encrypted by using the C-VLAN level MACsec.

Figure 11:
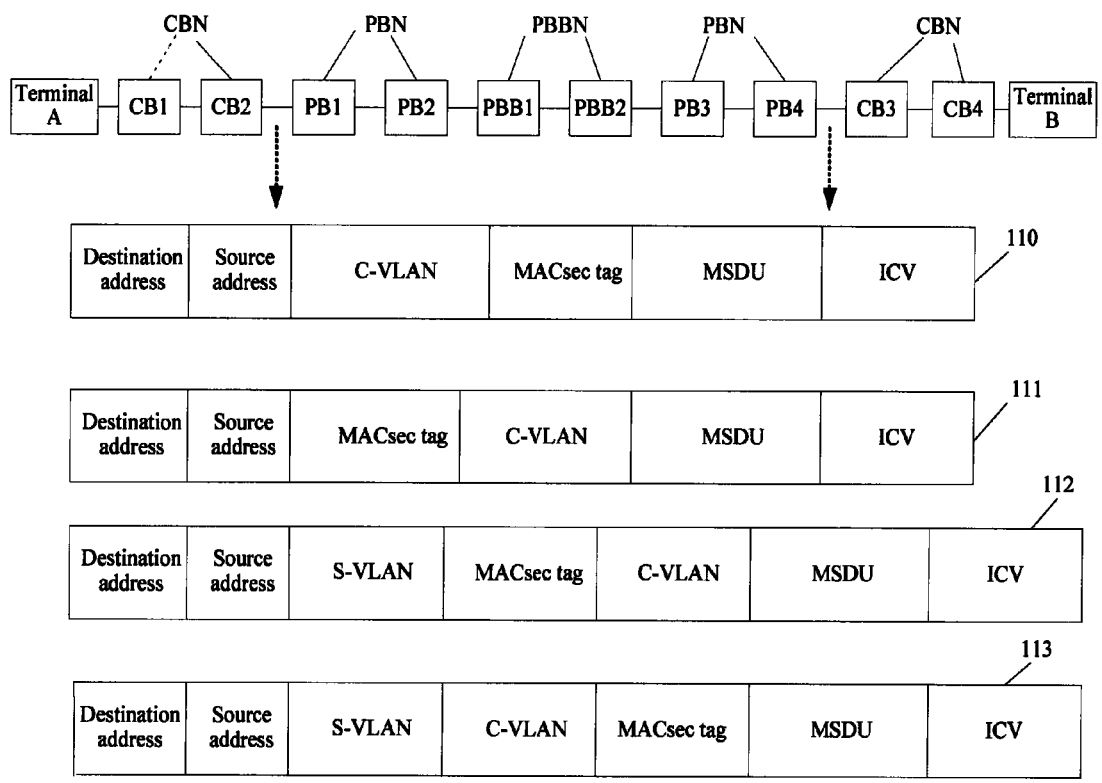
FIG. 11 shows an encrypted frame format obtained after a user data is encrypted by a CB2 with a C-VLAN level MACsec.

As for a user frame that does not adopt the fourth level user-terminal-level MACsec, the user frame is encrypted by using the third level C-VLAN level MACsec when reaching the CB2, and the encryption operation is performed according to a user interface type defined in IEEE P802.1ad. If an interface between the CB2 and the PB1 is a customer-tagged service interface (C-tagged service interface), the PB1 needs to recognize the C-VLAN, so that the user VLAN does not need to be encrypted but adopts a frame type 110 shown in FIG. 11. If the interface between the CB2 and the PB1 is a port-based service interface, and the PB1 does not recognize the C-VLAN, the user VLAN may be or may not be encrypted as well, and thus, the frame type 110 or a frame type 111 is adopted. Accordingly, if the interface between the CB2 and the PB1 is a service-tagged service interface (S-tagged service interface), the user VLAN may be encrypted, shown as 112 in FIG. 11, or may not be encrypted, shown as 113 in FIG. 11.

As for a control protocol frame sent from the CB2, if the frame belongs to a CBN network, for example, a frame applicable to a CBN spanning tree and a GARP VLAN registration protocol (GVRP) frame applicable to VLAN registration of the CBN itself, when such frames need to penetrate the PBN/PBBN, they are encrypted by using the third level C-VLAN level MACsec and then sent to the PB1. Other control protocol frames that do not need to penetrate the PBN are encrypted by using the first level link-level MACsec and then sent to the PB1.

As for a user frame that is not encrypted by using the fourth level user-terminal-level MACsec or the third level C-VLAN level MACsec, the frame is encrypted by using the second level S-VLAN level MACsec when reaching the PB2, and the encryption operation is performed according to a user interface type defined in the IEEE 802.1ah. If an interface between the PB2 and the PBB1 is an S-tagged service interface, the PBB1 needs to recognize the S-VLAN, so that the S-VLAN does not need to be encrypted but adopts a frame type 120 shown in FIG. 12. As for a transparent service interface, the PBB1 cannot recognize the S-VLAN, and thus the S-VLAN may be or may not be encrypted, so that the frame type 120 or a frame type 121 is adopted. If the interface between the PB2 and the PBB1 is an I-tagged service interface, frame types 122 and 123 are adopted. Definitely, when the S-VLAN tag is not needed, a frame type 124 is adopted.

As for a control protocol frame sent from the PB2, if the frame belongs to a PBN network, for example, a frame applicable to a PBN spanning tree and a GVRP frame applicable to VLAN registration of the PBN itself, when such frames need to penetrate the PBBN, they are encrypted by using the second level S-VLAN level MACsec and then sent to the PBB1. Other control protocol frames that do not need to penetrate the PBBN are encrypted by using the first level link-level MACsec and then sent to the PBB1.

If the user requires a higher security, the frame may be encrypted at a user terminal equipment, CB, and PB by using the user-terminal-level, C-VLAN level, and S-VLAN level MACsec respectively, or may be encrypted selectively, and meanwhile a MACsec encryption in two levels, three levels, or even four levels is realized by using the link-level MACsec so as to achieve a higher confidentiality. For example, in the network shown in FIG. 9, the terminal A encrypts a frame to be sent to the terminal B by using both the first level link-level and the fourth level terminal-level MACsec, and thus the CB1 receives a frame shown in FIG. 13.

Embodiment 3

In Embodiment 2, when a physical port of a bridge receives a MACsec communication frame, an SAK is searched through the SCI in the MACsec frame and the AN, and if the SAK is found, the frame is decrypted; otherwise, the frame is not decrypted but directly forwarded.

In order to quickly determine whether a MACsec frame needs to be decrypted or not before being forwarded or dropped, information about the MACSec level that an individual MACSec tag belongs to is carried in each MACSec tag in the MACsec frame. When a physical port receives a MACsec frame, it determines whether the MACsec frame needs to be decrypted or not before forwarding the MACsec frame according to the information about the MACSec level carried in the MACSec tag at the outermost level in the frame and the levels of MACsec entities (SecYs) of the frame itself.

If a corresponding MACsec level exists at the physical port itself, and a corresponding SecY can be found through the SAK, the frame is decrypted. After the outermost level of the frame is decrypted, a subsequent MACSec tag is determined in the same processing manner. When no corresponding MACsec level exists at the physical port, the frame is directly forwarded, and definitely, if the interface belongs to a terminal, the frame is directly dropped.

Figures 12, 13:
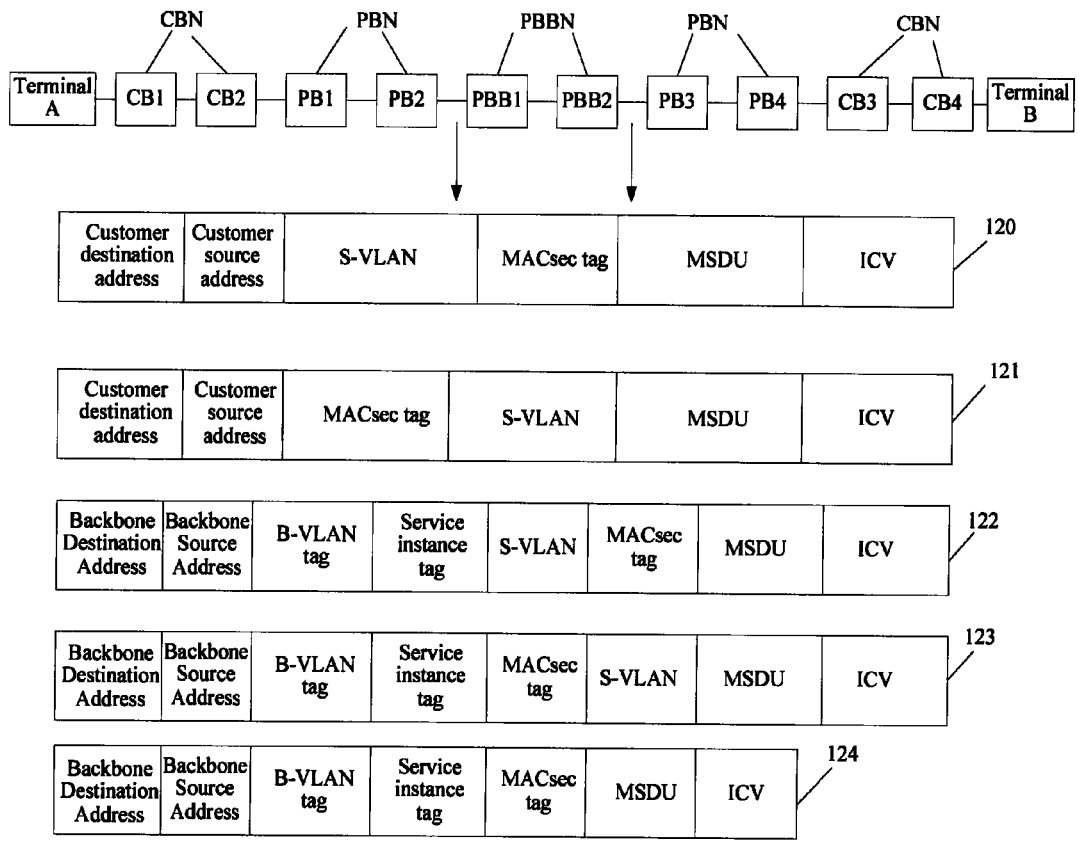
FIG. 12 shows an encrypted frame format obtained after a user data is encrypted by a PB2 with an S-VLAN level MACsec.
FIG. 13 is a schematic view of an encrypted frame format obtained after a user data is encrypted by the terminal A shown in FIG. 6 with a link layer and the terminal-level MACsec respectively.

If the terminal A encrypts a frame sent to the terminal B by using both the first level link-level and the fourth level terminal-level MACsec in the network shown in FIG. 6, the CB1 receives a frame shown in FIG. 13. As the CB1 has the first level link-level and the third level C-VLAN level MACsec, the CB1 first analyzes a MACSec tag 1 (SecTAG1) and finds out that the SecTAG1 belongs to the first level MACsec, and the CB1 itself has the first level link-level MACsec, so that the AN, the SCI, or the source address in the SecTAG1 is adapted to search for an SAK for decryption. After the first level MACsec is decrypted, the CB1 continues analyzing a MACSec tag 4 (SecTAG4) and finds out that the SecTAG4 belongs to the fourth level MACsec, and the CB1 itself does not have such MACsec level, so it does not further search for the SAK for decryption but directly forwards the frame.

There are two ways to carry the information about the MACSec level that the MACSec tag belongs to in the MACSec tag.

One way is to identify the MACsec level that the MACSec tag belongs to via a short length (SL) domain in the MACSec tag. It is specified in the IEEE 802.1ae that the MACSec tag in the MACsec frame includes an SL field of 8 bits. If a confidential data length<48, an SL value is equal to the length of the confidential data; otherwise, SL=0. However, actually, the SL merely uses bits 1 to 6 to indicate the confidential data length without using bits 7 and 8. Thus, when the sending KSP instance of the MACsec frame intends to add a MACSec tag, the bits 7 and 8 may be adopted to indicate a MACsec level that the MACSec tag belongs to.

Figures 14, 15:
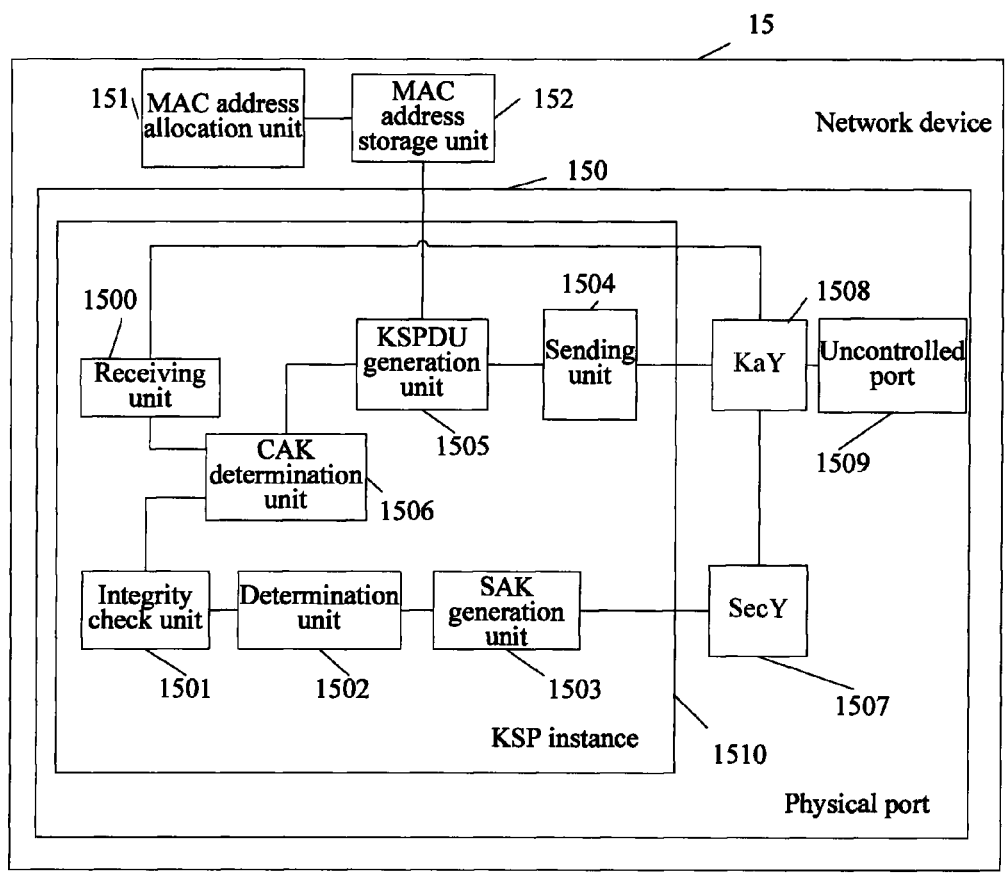
FIG. 14 shows a format of a MACsec tag in a MACsec frame added with a field of MAC level according to an embodiment of the present invention.
FIG. 15 is a schematic view of a logic structure of a network device configured with a MACsec according to Embodiment 4 of the present invention.

The other way is to add a new domain, MACsec level (ML), in the MACSec tag to identify the MACsec level that the MACSec tag belongs to. The domain ML is preferably placed after the MACsec frame parameter and before the control information (as shown in FIG. 14), or placed at other positions as well.

Embodiment 4

In the network system shown in FIG. 6, the MACsec level is divided in the network system, and the specific dividing manner and the characteristics of each MACsec level are obtained with reference to Embodiment 1.

Before using the MACsec, a device needs to obtain the CAK. The CAK may be configured manually or obtained from an authentication server after being authenticated. When configuring the CAK, the MACsec level that the CAK belongs to needs to be clearly stated.

In the network system shown in FIG. 6, referring to FIG. 15, the MACsec mechanism is disposed at a physical port 150 of a network device 15.

As MACsec of multiple levels may exist at the physical port 150 of the network device 15, a plurality of multicast addresses needs to be introduced, and each multicast address corresponds to one MACsec level. As shown in Table 1, x is to be determined, and y indicates that the MACsec level determines to configure a MAC address allocation unit on the network device. Therefore, a MAC address allocation unit 151 is configured at the network device, and adapted to allocate a MAC multicast address for each MACsec level so as to make the MAC address corresponding to the MACsec level one by one. Moreover, the MAC address allocation unit 151 is also adapted to store the MAC multicast address allocated for each MACsec level into a MAC address storage unit 152.

As shown in FIG. 15, the physical port includes an uncontrolled port 1509, a KaY 1508, and a KSP instance 1510.

The uncontrolled port 1509 is adapted to receive and send a KSPDU and determine whether a MACsec level that the KSPDU belongs to exists at the uncontrolled port or not. If yes, the uncontrolled port 1509 sends the KSPDU to a KaY corresponding to the MACsec level; otherwise, the uncontrolled port 1509 sends the KSPDU to the next link.

The KaY 1508 is adapted to generate KSP instances under the current KaY, and the KSP instances receive and send KSPDUs via the KaY.

The KSP instance 1510 includes a KSPDU generation unit 1505, a sending unit 1504, a receiving unit 1500, a CAK determination unit 1506, an integrity check unit 1501, and a determination unit 1502.

The KSPDU generation unit 1505 generates a KSPDU adapted to obtain an SAK, and the KSPDU carries a CKI of the current KSP instance, information about MACsec level that the current KSP instance belongs to, and information about a KC parameter.

In the current KSP instance, as the MAC address allocation unit 151 allocates different MAC addresses for different MACsec levels respectively, the KSPDU generation unit 1505 merely needs to obtain a MAC multicast address corresponding to the current MACsec level from the MAC storage unit 152 to serve as the destination address when generating the KSPDU. The network obtains the MACsec level that the KSPDU belongs to according to a MAC address allocation rule and the MAC address.

The sending unit 1504 is respectively connected to the KSPDU generation unit 1505 and the KaY 1508, and adapted to send the KSPDU generated by the KSPDU generation unit 1505 to a link via the KaY 1508.

The sending unit 1504 may send the KSPDU in different communication manners depending on actual requirements. For example, in all the communication circumstances, a multicast manner may be adopted, and in a point-to-point communication, a unicast manner may be adopted.

The receiving unit 1500 is connected to the KaY 1508, and adapted to receive the KSPDU sent from the KaY 1508 to the current KSP instance.

The CAK determination unit 1506 is connected to the receiving unit 1500, and adapted to read a CKI carried in the received KSPDU, and determine whether the CKI of the current KSP instance is consistent with the CKI carried in the KSPDU or not. If yes, it indicates that the KSPDU comes from the same CA, and the CAK determination unit 1506 informs the KSPDU generation unit to generate the KSPDU; otherwise, the CAK determination unit 1506 informs the receiving unit 1500 to drop the KSPDU.

The integrity check unit 1501 is connected to the CAK determination unit 1506. If the CAK determination unit 1506 determines that the KSPDU comes from the same CA, the integrity check unit 1501 carries out the same calculation on all the bytes from the destination MAC address to the ICV. If the ICV values are identical, the KSPDU is considered unchanged. If the sending KSP instance adopts a different CAK, the check fails. As the integrity check of the KSPDU fails, the integrity check unit 1501 directly drops the KSPDU.

The determination unit 1502 is connected to the integrity check unit 1501, and adapted to determine whether an MN carried in the KSPDU is larger than an MN recorded locally or not after the check succeeds. If yes, the current record is updated; otherwise, it indicates that the KSPDU is a mis-sequence or replay attack frame, and the integrity check unit 1501 directly drops the KSPDU.

The KSPDU generation unit 1505 is connected to the determination unit 1506, and adapted to obtain an SAK based on the KC according to the KSPDU by a certain rule, and report the obtained SAK to the KaY and a SecY 1507.

The SAK may be obtained based on the KC through calculation in the following steps.

In the calculation of the SAK, each KSP instance extracts the KCs from all the received KSPDUs, then sorts all the KCs into a large random number M according to the sequence of the MIs of the sending KSP instances, and calculates the SAK by using a CMAC mode of an AES:

$$SAK=AES-CMAC(K,M,128).$$

M is the large random number, and K is generated through an ECB mode of the AES:

$$K=AES-ECB(CAK,0X2).$$

Each KSP instance owns the same CAK and M, so that the SAK calculated by each KSP instance is identical. When a certain KSP instance intends to apply for a new SAK, it merely needs to change its own KC, and accordingly all the KSP instances need to recalculate the SAK. Each SAK is identified by a key identifier (KI), and the KI is an XOR value of all the KCs.

The SAK may be obtained based on the KC through an SAK distribution manner in the following steps.

In the SAK distribution manner, first of all, one KSP instance is selected from each CA to function as a key server, or the key server may be determined through configuration or determined according to a protocol. Generally, after receiving the KSPDUs sent from the other KSP instances, the current KSP instance compares the MI of its own with the MIs of the sending KSP instances of the KSPDUs, so as to select a KSP instance with the maximum MI or minimum MI to function as the key server. The key server performs an XOR operation on the KCs of all the KSP instances to serve as the KI, selects one random number to serve as the SAK, and encrypts the SAK by using a KEK. The KEK is calculated through the ECB mode of the AES:

$$KEK=AES-ECB(CAK,0X0).$$

The key server places the encrypted SAK and the KI in the KSPDU for being multicasted to each KSP instance, and after receiving the KSPDU, the KSP instances perform the decryption with the KEK to obtain the SAK.

Embodiment 5

Figure 16:
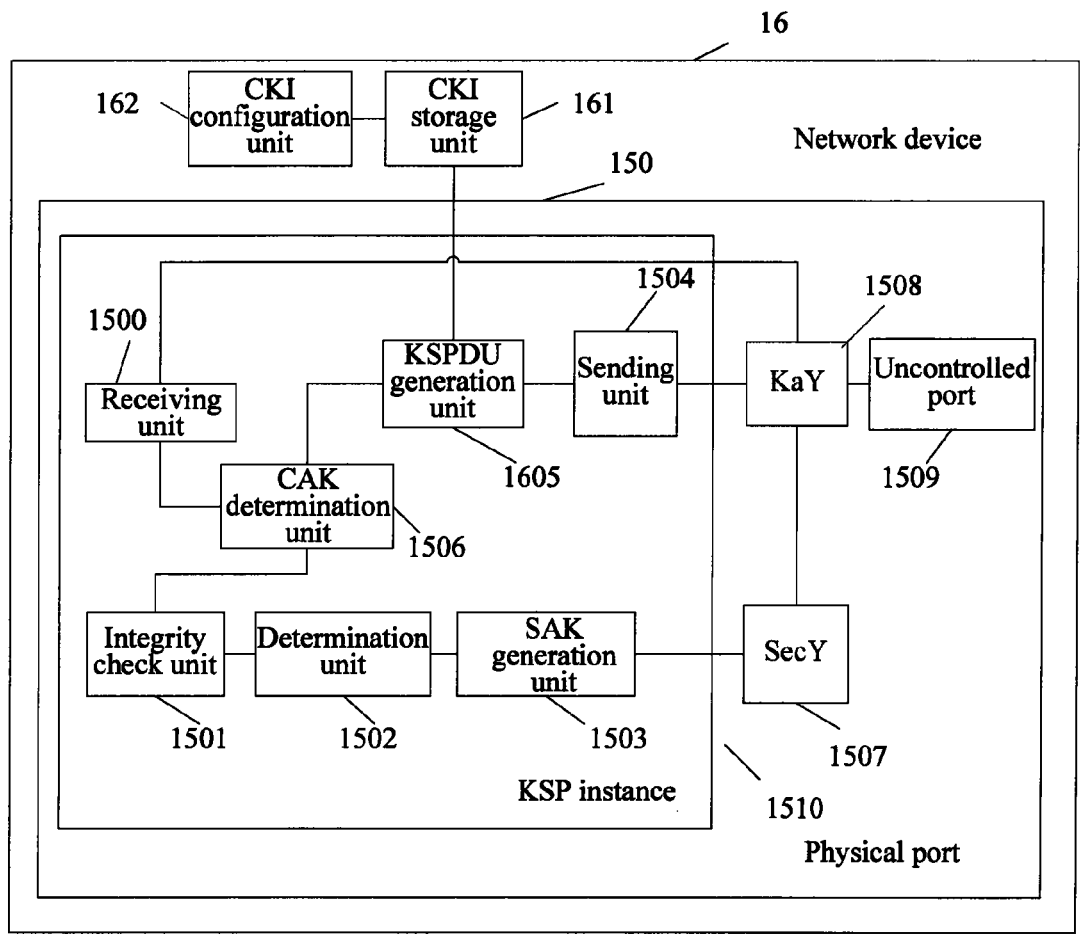
FIG. 16 is a schematic view of a logic structure of a network device configured with a MACsec according to Embodiment 5 of the present invention.

Different from Embodiment 4, in this embodiment, the MACsec level that the KSPDU belongs to is identified by the CKI through configuration. As shown in FIG. 16, a network device 16 includes a CKI configuration unit 162 and a CKI storage unit 161.

The CKI configuration unit 162 is adapted to configure a CKI for each MACsec level, so that each CKI corresponds to a MACsec level one by one, and also adapted to store the CKI configured for each MACsec level into the CKI storage unit 161.

The CKI storage unit 161 is adapted to store the CKI configured for each MACsec level by the CKI configuration unit 162.

The CKI configuration unit 162 and the CKI storage unit 161 may be configured within a KSP instance 1610 or within the KaY 1508.

Different from Embodiment 4, a KSPDU generation unit 1605 in the KSP instance obtains a CKI corresponding to a MACsec level that the KSPDU belongs to from the CKI storage unit 161 when generating a KSPDU, and identifies the MACsec level that the current KSPDU belongs to via the CKI.

Embodiment 6

Different from Embodiments 4 and 5, in this embodiment, a MACsec level identifier is carried in the KSPDU to enable the KSPDU to carry information about the MACsec level that the KSPDU belongs to.

When generating a KSPDU, the KSPDU generation unit adds a field CKI for identifying a MACsec level that the KSPDU belongs to according to the MACsec level that the current KSPDU belongs to, so that the CKL is adapted to identify the MACsec level that the KSPDU belongs to. A schematic view of a KSPDU structure is shown in FIG. 8. For example, the field CKL is "00", indicating that the current MACsec level is a first level MACsec, and the field CKL is "11", indicating that the current MACsec level is a fourth level MACsec.

The other aspects are similar to those of Embodiments 4 and 5.

Embodiment 7

Figure 17:
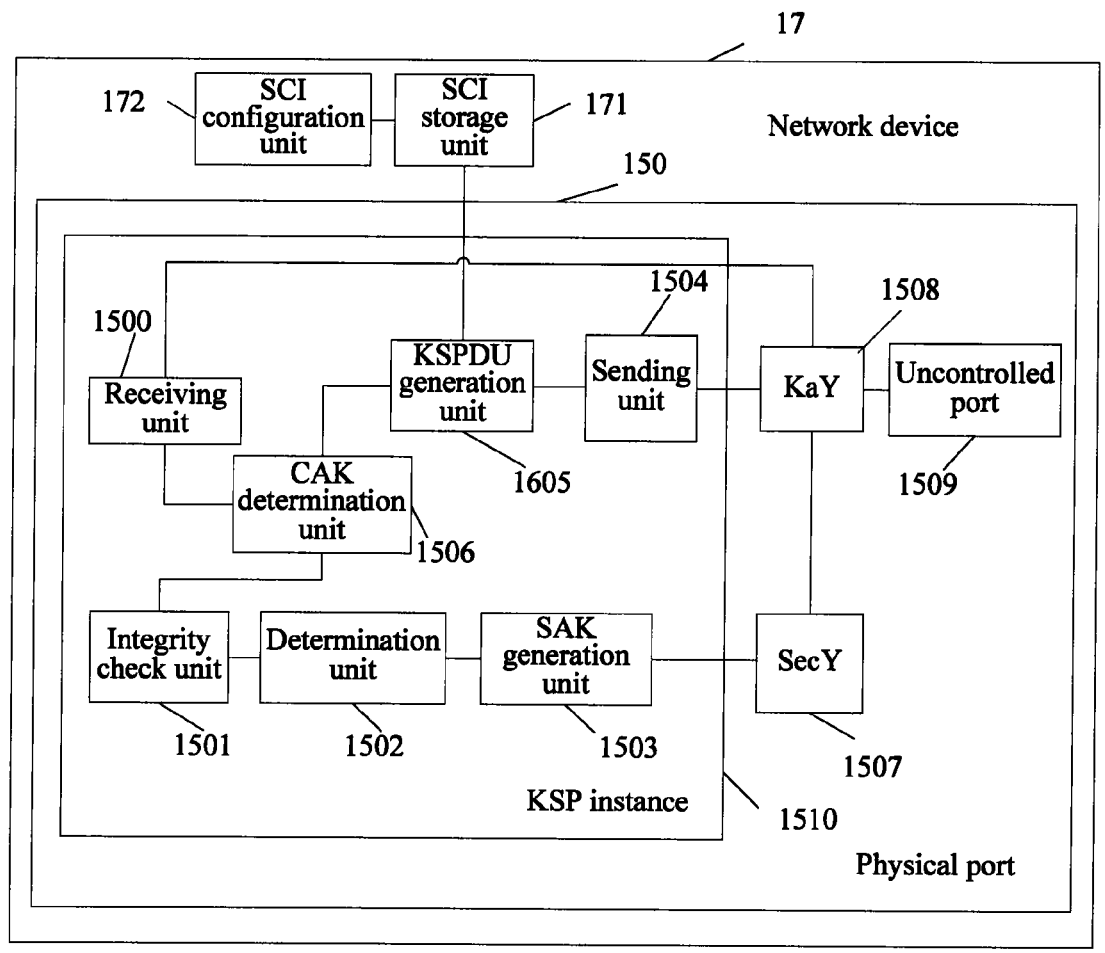
FIG. 17 is a schematic view of a logic structure of a physical port for a network device according to Embodiment 7 of the present invention.

This embodiment is applicable to a point-to-point circumstance, in which an opposite end SCI corresponding to a specified MACsec level is configured for a KSP instance. As shown in FIG. 17, a network device 17 includes an SCI configuration unit 172 and an SCI storage unit 171.

The SCI configuration unit 172 is adapted to configure an opposite end SCI corresponding to a specified MACsec level, and adapted to store the opposite end SCI configured for each MACsec level into the SCI storage unit 171.

The SCI storage unit 171 is adapted to store the SCI configured by the SCI configuration unit 172.

The SCI configuration unit 172 and the SCI storage unit 171 may be configured within the KSP instance 1610 or within the KaY 1508.

Upon receiving the KSPDU, the receiving unit 1500 in the KSP instance extracts an SCI from the KSPDU, and then obtains a MACsec level that the current KSPDU belongs to from the SCI storage unit 171.

Embodiment 8

The MACsec level is divided in the network system shown in FIG. 6, and after obtaining the current SAK, each SecY corresponding to each MACsec level may encrypt or decrypt a communication frame by using the SAK upon requirements, thus ensuring the security and confidentiality of the network communication.

In the network system shown in FIG. 6, each communication device configured with MACsec is respectively disposed with at least one SecY. The SecY saves an SAK that belongs to the KSP instance of the SecY, and encrypts or decrypts the communication frame with the SAK upon requirements.

Figure 18:
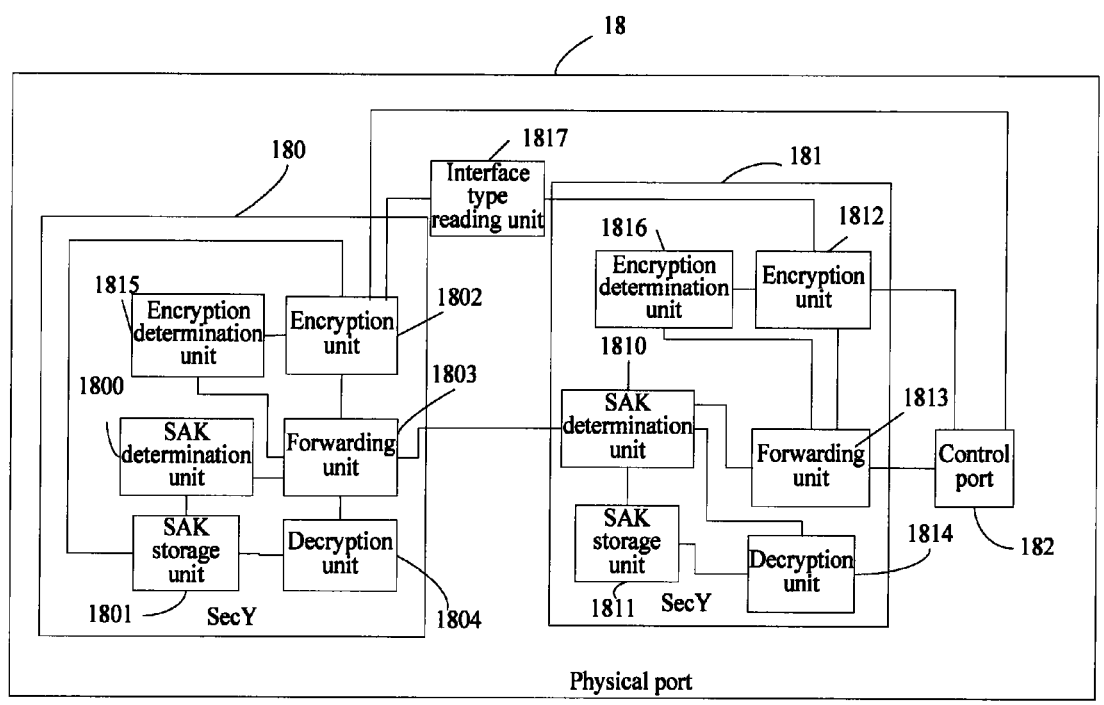
FIG. 18 is a schematic view of a logic structure of a physical port for a network device according to Embodiment 8 of the present invention.

Referring to FIG. 18, it is assumed that two MACsec levels are configured at a physical port 18 of a network device, each MACsec level corresponds to one CA, and each CA corresponds to at least one SecY. The physical port 18 of the network device includes a SecY 180, a SecY 181, and an interface type reading unit 1817.

A control port 182 is a logical port adapted to receive and send a MACsec frame corresponding to an uncontrolled port (not shown), and the uncontrolled port is adapted to receive and send a KSPDU.

The interface type reading unit 1817 is adapted to obtain an interface type of the physical port 18. Each SecY has the same structure, as shown in FIG. 18. Taking the SecY 180 as an example, the SecY 180 includes an SAK storage unit 1801, an SAK determination unit 1800, an encryption determination unit 1815, a decryption unit 1804, an encryption unit 1802, and a forwarding unit 1803.

The SAK storage unit 1801 is adapted to store SAKs under the SecY 180.

The SAK determination unit 1800 is connected to the SAK storage unit 1801, and adapted to determine whether an SAK adapted to decrypt the received communication frame exists in the SecY or not. If yes, the SAK determination unit 1800 sends the communication frame to a decryption unit 1804; otherwise, the SAK determination unit 1800 directly sends the communication frame to a forwarding unit 1803.

The encryption determination unit 1815 is adapted to determine whether the received communication frame needs to be encrypted or not, and if yes, the encryption determination unit 1815 sends the communication frame to the encryption unit 1802; otherwise, the encryption determination unit 1815 directly sends the communication frame to the forwarding unit 1803.

The decryption unit 1804 is connected to the SAK determination unit 1800 and the SAK storage unit 1801, and adapted to decrypt the communication frame with the SAK.

The encryption unit 1802 is respectively connected to the encryption determination unit 1815, the SAK storage unit 1801, the forwarding unit 1803, the control port 182, and the interface type reading unit 1817, and adapted to encrypt the communication frame by using the latest SAK based on the determination result from the encryption determination unit 1815 according to an interface type obtained from the interface type reading unit 1817. Particularly, if the physical port 18 is a port-based service interface, the C-VLAN tag and the MSDU in the communication frame are encrypted, or merely the MSDU is encrypted. If the physical port 18 is a C-tagged service interface provided by a PBN, the MSDU in the communication frame is encrypted. If the physical port 18 is an S-tagged service interface provided by the PBBN, merely data behind the service provider TAG (S-tag) in the communication frame is encrypted.

The forwarding unit 1803 is adapted to send the communication frame to the SecY 181, and the SecY 181 performs a similar processing as the current SecY.

Referring to FIG. 18, after the communication frame reaches the physical port 18 of the network device, the SecY 180 first analyzes the communication frame. If the SecY 180 cannot decrypt the communication frame, it sends the communication frame to the SecY 181, and the SecY 181 processes the communication frame in a similar manner as the SecY 180. After finishing the processing, the SecY 181 sends the processed communication frame to a network link via the physical port 18.

It is assumed that the network device shown in FIG. 18 is a CB1 in the system shown in FIG. 6, the SecY belongs to a link-level MACsec, and the SecY belongs to a C-VLAN level MACsec. An Ethernet frame shown in the figure is a user data packet encrypted and sent by a user terminal 1. When the user data packet reaches the CB1, as an SAK corresponding to the user data packet does not exist in the SecY 180 and the SecY 181 of the CB1, the CB1 cannot read the information about the user data from the terminal user, thus ensuring the confidentiality of the user data. Further, if the user terminal has special requirements, the SecY 180 and/or the SecY 181 may further encrypt the user data packet for a second time or a third time upon requirements.

Seen from this embodiment, the data can be encrypted and decrypted by selecting different MACsec levels depending on actual MACsec application requirements when MACsec levels are preset in the communication network according to the application ranges of the MACsec, and the SecY corresponding to the MACsec level and the CAK corresponding to each MACsec level are preset on the network device configured with a MACsec mechanism in the network. Each MACsec level is independent from each other, and cannot be decrypted among each other, so as to ensure the confidentiality and security of the Ethernet communication, thereby facilitating the control of the confidentiality of the communication. Compared with the prior art, the present invention greatly enhances the communication efficiency.

Further, as for the user data communication between terminal users, the data may be encrypted or decrypted merely by using the MACsec level between the terminals, which not only prevents any bridge between the terminals from decrypting the user data so as to ensure the confidentiality of the data communication, but also achieves a higher network communication efficiency compared with the operation mode in the prior art of decrypting and encrypting link by link through the MACsec.

In addition, as for the user data communication between terminal users, if the user requires a higher security, a MACsec level between CBNs and/or a MACsec level between PBNs may be selected for encrypting the user data, and thus, an encryption in multiple levels is achieved to ensure the confidentiality of the user data. Therefore, the present invention has a higher network communication efficiency compared with the operation mode in the prior art of decrypting and encrypting link by link by using the MACsec.

Embodiment 9

Different from Embodiment 8, in this embodiment, a MACsec tag for a MACsec frame is improved to enable the MACsec tag to carry information about a MACsec level that the MACSec tag belongs to. For example, bits 7 and 8 in the SL field of the MACsec tag are adapted to indicate a MACsec level that the MACSec tag belongs to. Alternatively, in the MACSec tag, a new field ML is added to identify a MACsec level that the MACSec tag belongs to.

The MACsec frame carries information about the MACsec level that the MACsec frame belongs to, so that by carrying information about the MACsec level that each MACsec tag belongs to in each MACsec tag of the MACsec frame, once receiving an encrypted MACsec frame, the physical port of the network device determines whether the MACsec frame needs to be decrypted or not before forwarding the MACsec frame according to the information about the MACsec level carried in the outermost MACsec tag and the levels of SecYs in the MACsec frame.

Figure 19:
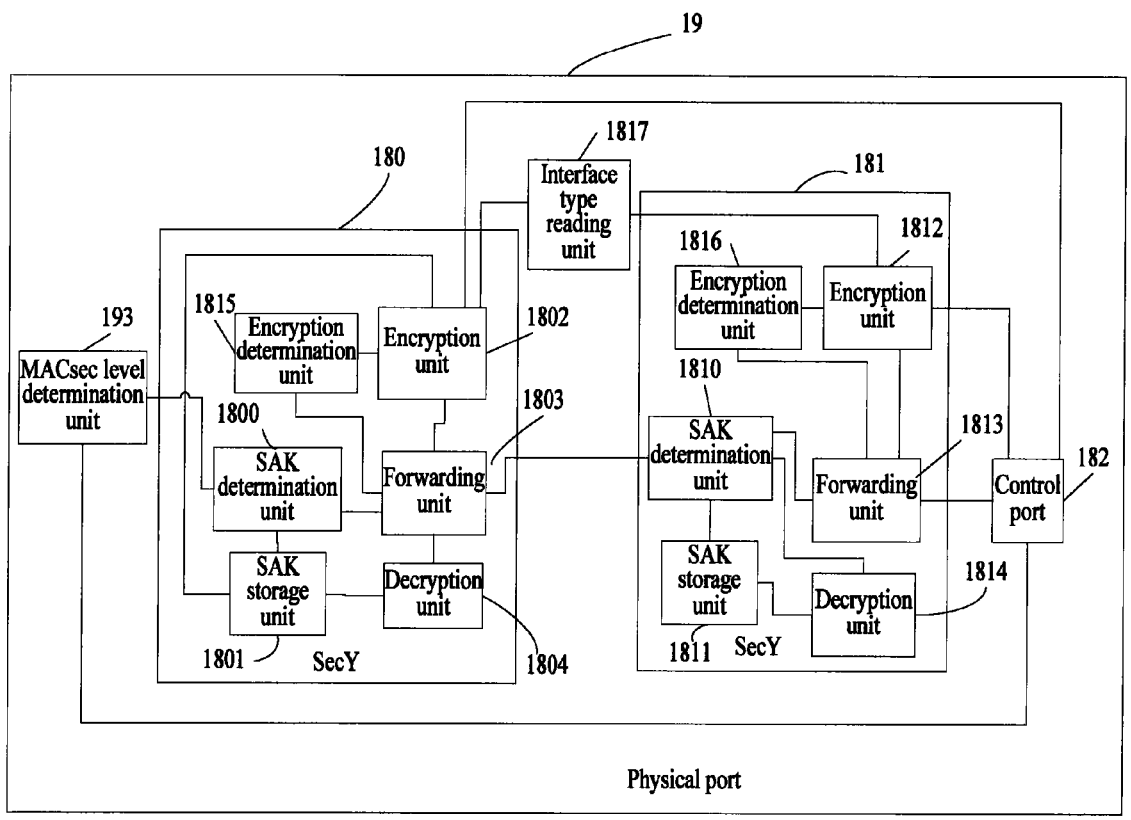
FIG. 19 is a schematic view of a logic structure of a physical port for a network device according to Embodiment 9 of the present invention.

Referring to FIG. 19, the difference between the physical port 19 and the physical port shown in FIG. 18 lies in that, in this embodiment, a MACsec level determination unit 193 is newly added at the physical port. The MACsec level determination unit 193 is respectively connected to the SAK determination unit 1800 and the control port 182, and adapted to make MACsec determination for the MACsec that reaches the current port, and determine whether a MACsec level corresponding to the MACsec frame exists at the current port or not. If a corresponding MACsec level exists at the physical port 19, and a corresponding SecY can be found through the SAK, the frame is decrypted. After the outermost level of the frame is decrypted, a subsequent MACSec tag is determined in the same processing manner. When no corresponding MACsec level exists at the physical port 19, the frame is directly forwarded to the control port 182, and definitely, if the port does not belong to a terminal, the frame is directly dropped.

Therefore, this embodiment further improves the speed for processing Ethernet frames compared with Embodiment 7, especially when a plurality of SecYs exists at the physical port, thus greatly enhancing the network communication efficiency.

The method for realizing MACsec and the network device according to embodiments of the present invention are illustrated above in great detail. The principles and implementation modes of the present invention have been demonstrated through specific examples. However, the descriptions about the above embodiments are merely intended to make the methods and ideas of the present invention comprehensible. It will be apparent to those skilled in the art that various modifications and variations can be made to the structure of the present invention without departing from the scope or spirit of the present invention. To sum up, the contents of the specification cannot be considered as limiting the present invention.

What is claimed is:

1. A method for realizing medium access control security (MACsec) in a network system, wherein the network system is formed by a plurality of terminals, and bridges of a plurality of networks;

multiple MACsec levels are preset on the terminals or the bridges in one kind of the plurality of networks according to MACsec application ranges, and each of the multiple MACsec levels spans across multiple kinds of the plurality of networks;

a single secure connectivity association key (CAK) is preset to part or all of the terminals or the bridges in a single MACsec level of the multiple MACsec levels;

each of the terminals or bridges comprises a key selection protocol (KSP) instance, the KSP instance owns the CAK preset to the terminal or bridge, and multiple KSP instances which have a same CAK belong to a same secure connectivity association (CA);

said method comprising:

receiving, by a terminal or bridge, a key selection protocol data unit (KSPDU) from another terminal or bridge, wherein the KSPDU carries an identifier of the CAK (CM) of a sending KSP instance of the other terminal or bridge and information about a first MACsec level that the sending KSP instance belongs to;

determining, by the terminal or bridge, whether a receiving KSP instance in the first MACsec level indicated by the information of the first MACsec level carried in the KSPDU exists in the terminal or bridge:

if the receiving KSP instance in the first MACsec level does not exist in the terminal or bridge:

forwarding, by the terminal or bridge, the KSPDU to a next terminal or bridge; or if the receiving KSP instance in the first MACsec level exists in the terminal or bridge:

determining, by the receiving KSP instance, whether the receiving KSP instance and the sending KSP instance belong to a same CA based on the CKI carried in the KSPDU; and if the receiving KSP instance and the sending KSP instance belong to the same CA: generating, by the receiving KSP instance, a secure association key (SAK) based on the KSPDU.

2. The method according to claim 1, wherein
the KSPDU comprises a destination address field for carrying a multicast MAC address, the multicast MAC address corresponds to the first MACsec level, and different multicast MAC addresses correspond to different MACsec levels.

3. The method according to claim 1, wherein
the CKI carried in the KSPDU corresponds to the first MACsec level, and different CKIs correspond to different MACsec levels.

4. The method according to claim 1, wherein
values of the CKIs are made in different ranges, and the values of the CKIs in different ranges correspond to different MACsec levels.

5. The method according to claim 1, wherein
the KSPDU carries a secure channel identifier (SCI) of the receiving KSP instance; and, if the same CA in the first MACsec level merely comprises two KSP instances and the two KSP instances are respectively located at two terminals or bridges, the SCI in the KSPDU corresponds to the first MACsec level.

6. The method according to claim 1, wherein
the KSPDU comprises a CAK level (CKL) field for carrying the information of the first MACsec level, and different CKLs correspond to different MACsec levels.

7. The method according to claim 1, wherein the plurality of networks include at least one of a customer bridged network (CBN), a provider bridged network (PBN), and a provider backbone bridged network (PBBN).

8. The method according to claim 1, further comprising:
receiving, by a receiving MACsec entity (SecY) of the terminal or bridge, a communication frame encrypted with a first SAK by another terminal or bridge;
determining, by the receiving SecY, whether the receiving SecY has the first SAK of the communication frame or not:
if the receiving SecY has the first SAK of the communication frame:
decrypting the communication frame by using the first SAK; or
if the receiving SecY does not have the first SAK of the communication frame:
forwarding the communication frame to a next SecY if the receiving SecY is at a bridge device, and dropping the communication frame if the receiving SecY is at a terminal equipment.

9. The method according to claim 8, wherein the method further comprises:
reading, by a physical port where the receiving SecY is located, information about the MACsec level carried by the communication frame, and determining whether the MACsec level indicated by the information about the MACsec level exists at the terminal or bridge or not:
if the MACsec level exists at the terminal or bridge:
sending the communication frame to the receiving SecY; or
if the MACsec level does not exist at the terminal or bridge:
directly forwarding the communication frame to a next terminal or bridge.

10. A method for realizing medium access control security (MACsec) in a network system, wherein the network system is formed by a plurality of terminals, and bridges of a plurality of networks;
multiple MACsec levels are preset on the terminals or the bridges in one kind of the plurality of networks according to MACsec application ranges, and each of the multiple MACsec levels spans across multiple kinds of the plurality of networks;
a single secure connectivity association key (CAK) is preset to part or all of the terminals or the bridges in a single MACsec level of the multiple MACsec levels;
each of the terminals or bridges comprises a key selection protocol (KSP) instance, the KSP instance owns the CAK preset to the terminal or bridge, and multiple KSP instances which have a same CAK belong to a same connectivity association (CA);
said method comprising:
receiving, by a terminal or bridge, a key selection protocol data unit (KSPDU) from another terminal or bridge, wherein the KSPDU carries an identifier of the CAK (CKI) of a sending KSP instance of the other terminal or bridge and a medium access control MAC) multicast address, which indicates information about a first MACsec level that the sending KSP instance belongs to;
determining, by the terminal or bridge, whether a receiving KSP instance in the first MACsec level indicated by the MAC multicast address carried in the KSPDU exists in the terminal or bridge:
if the receiving KSP instance in the first MACsec level does not exist in the terminal or bridge:
forwarding, by the terminal or bridge, the KSPDU to a next terminal or bridge; or
if the receiving KSP instance in the first MACsec level exists in the terminal or bridge:
determining, by the receiving KSP instance, whether the receiving KSP instance and the sending KSP instance belong to a same CA based on the CKI carried in the KSPDU; and
if the receiving KSP instance and the sending KSP instance belong to the same CA: generating, by the receiving KSP instance, a secure association key (SAK) based on the KSPDU.

11. The method according to claim 10, wherein
different MACsec application ranges correspond to different MAC multicast addresses, and each of the MAC multicast addresses corresponds to each of the MACsec application ranges one by one.

12. The method according to claim 10, further comprising:
receiving, by a receiving MACsec entity (SecY) of the terminal or bridge, a communication frame encrypted with a SAK by another terminal or bridge;
determining, by the receiving SecY, whether the receiving SecY has the SAK of the communication frame or not:
if the receiving SecY has the SAK of the communication frame: decrypting the communication frame by using the SAK; or
if the receiving SecY does not have the SAK of the communication frame: forwarding the communication frame to a next SecY if the receiving SecY is at a bridge device, and dropping the communication frame if the receiving SecY is at a terminal equipment.

13. The method according to claim 12 comprising:
reading, by a physical port where the receiving SecY is located, a MAC multicast address corresponding to a MACsec level carried by the communication frame, and determining whether the MACsec level indicated by the MAC multicast address exists at the terminal or bridge or not:
if the MACsec level exists at the terminal or bridge: sending the communication frame to the receiving SecY; or if the MACsec level does not exist at the terminal or bridge:
directly forwarding the communication frame to a next terminal or bridge.

14. A network device, comprising an uncontrolled port and a receiving key selection protocol (KSP) instance, wherein the receiving KSP instance is preset in a medium access control security (MACsec) level according to MACsec application ranges, and the MACsec level spans across multiple kinds of networks;
the receiving KSP instance owns a secure connectivity association key (CAK) preset to the network device;
multiple KSP instances of different network devices which have a same CAK belong to a same secure connectivity association (CA);
the uncontrolled port receives a key selection protocol data unit (KSPDU) from another network device, wherein the KSPDU carries an identifier of the CAK (CKI) of a sending KSP instance of the other network device and information about a MACsec level that the sending KSP instance belongs to;
the uncontrolled port determines whether the receiving KSP instance is in a MACsec level indicated by the information of the MACsec level carried in the KSPDU:
if the receiving KSP instance is in the MACsec level:
the uncontrolled port forwards the KSPDU to a next network device; or
if the receiving KSP instance is not in the MACsec level:
the uncontrolled port transfers the KSPDU to the receiving KSP instance;
the and said receiving KSP instance comprises:
a CAK determination unit, adapted to receive the KSPDU transferred by the uncontrolled port, determine whether the receiving KSP instance and the sending KSP instance belong to a same CA based on the CKI carried in the KSPDU, and transfer the KSPDU if the receiving KSP instance and the sending KSP instance belong to the same CA; and
a secure association key (SAK) generation unit, adapted to receive the KSPDU transferred by the CAK determination unit, and generate an SAK based on the KSPDU.

15. The network device according to claim 14, wherein the receiving KSP instance further comprises:
a MAC address allocation unit, adapted to allocate a multicast MAC address for the MACsec level preset to the sending KSP instance, wherein the multicast MAC address corresponds to the MACsec level; and
a KSPDU generation unit, adapted to generate a KSPDU carrying a CKI of the receiving KSP instance and the MAC multicast address allocated to the MACsec level that the receiving KSP instance belongs.

16. The network device according to claim 14, further comprising a medium access control security (MACsec) entity (SecY), wherein the SecY comprises:
a receiving unit, adapted to receive a communication frame encrypted with a first SAK by another terminal or bridge, wherein the communication frame carries information about a MACsec level that the other terminal or bridge belongs to;
a MACsec level determination unit, adapted to determine whether the MACsec level indicated by the information about the MACsec level carried in the communication frame exists in the SecY or not, and inform an SAK determination unit to execute a determination operation if the MACsec level of the communication frame exists;
an SAK determination unit, adapted to determine whether the SecY has a SAK of the communication frame or not; and
a decryption unit, adapted to decrypt the communication frame by using the SAK if the SecY has the SAK of the received communication frame according to a determination result of the SAK determination unit.

* * * * *

UNITED STATES PATENT AND TRADEMARK OFFICE
CERTIFICATE OF CORRECTION

PATENT NO. : 8,386,772 B2  
APPLICATION NO. : 12/398580  
DATED : February 26, 2013  
INVENTOR(S) : Guan Page 1 of 1

It is certified that error appears in the above-identified patent and that said Letters Patent is hereby corrected as shown below:

In the Claims:

Column 20, line 51, "(CM)" should read -- (CKI) --.

Signed and Sealed this
Twenty-first Day of May, 2013

Teresa Stanek Rea
*Acting Director of the United States Patent and Trademark Office*